United States Patent [19]

Schutt

[11] Patent Number: 4,620,595

[45] Date of Patent: Nov. 4, 1986

[54] RECOVERING OIL BY INJECTING AMMONIATED AND NITRITED SEAWATER

[75] Inventor: Hans U. Schutt, Houston, Tex.

[73] Assignee: Shell Offshore Inc., Houston, Tex.

[21] Appl. No.: 768,263

[22] Filed: Aug. 22, 1985

[51] Int. Cl.⁴ .................... E21B 43/22; E21B 43/20
[52] U.S. Cl. ................................. 166/275; 166/273; 166/274
[58] Field of Search ............... 166/273, 271, 274, 275, 166/300; 252/8.55 D, 8.5 A

[56] References Cited

U.S. PATENT DOCUMENTS

| | | | |
|---|---|---|---|
| 2,813,583 | 11/1957 | Marx et al. | 166/271 |
| 2,839,467 | 6/1958 | Hutchinson | 252/8.55 D |
| 2,843,545 | 7/1958 | Wolf | 252/8.55 D |
| 3,101,781 | 8/1963 | Connally | 166/273 |
| 3,464,492 | 9/1969 | Friedman | 166/274 X |
| 3,625,888 | 12/1971 | Redmore | 255/8.55 D |
| 4,399,868 | 8/1983 | Richardson et al. | 166/300 |
| 4,406,327 | 9/1983 | Fair et al. | 166/300 |
| 4,515,701 | 5/1985 | Hoskin | 166/275 X |
| 4,527,626 | 7/1985 | Cantu et al. | 166/275 |

*Primary Examiner*—Stephen J. Novosad
*Assistant Examiner*—Thomas J. Odar

[57] ABSTRACT

An improved floodwater for oil recovery comprises seawater which is free of undesirable proportions of bacteria, solids and oxygen, has a pH at least near, but not more than, about 9.5, and contains a minor amount of ammonium and nitrite ions and, optionally, surfactant, effective for increasing its capability of displacing oil.

6 Claims, No Drawings

RECOVERING OIL BY INJECTING AMMONIATED AND NITRITED SEAWATER

BACKGROUND OF THE INVENTION

This invention relates to injecting seawater into a subterranean oil reservoir to displace oil toward a production location. More particularly, the invention relates to a waterflood oil recovery process in which the flood water is, preferably, ammoniated and nitrited seawater.

As indicated in "How to Treat Seawater for Injection Projects" by D. L. Carlberg in World Oil, July 1979, page 67, "With careful treatment the virtually unlimited supply of readily available ocean water can be used successfully as a source of injection fluid for offshore or near shore pressure maintenance of water flood projects." The article mentions that organic growths in seawater range from bacteria to sea weed, barnacles and fish, and indicates that a basic treatment scheme, for seawater to be used as an injection medium, includes adding a biocide, filtering and deoxygenating and possibly, scale inhibiting the seawater.

An article by R. W. Mitchell in Journal of Petroleum Technology, June 1978, page 887, is titled "The Forties Field Seawater Injection System". The article recommends similar basic treatments of the seawater. It also describes a particular advantage of using chlorine or a hypochlorite as a biocide in combination with deoxygenation by stripping with production gas and addition of ammonium bisulfite, where the final pH of the water is about 7.5 to 9. The article mentions that although few scavengers can reduce the oxygen to less than 50 ppm, this can be achieved by bisulfite, but only if chlorine is present in the system.

An article by C. C. McCune in Journal of Petroleum Technology, October 1982, at page 2265, is titled "Seawater Injection Experience: An Overview". It mentions that seawater is being used more and more as the water injected into subterranean reservoirs and recommends substantially the same basic treatments of the seawater. It also indicates that adding chlorine as a biocide and $SO_2$ as an oxygen scavenger tends to reduce the pH of the seawater from a normal of about 8 to about 5.8.

SUMMARY OF THE INVENTION

The present invention relates to a process for recovering oil from a subterranean reservoir in a location in which seawater is economically available. The seawater to be injected is treated by adding a biocide, mechanically removing solids and removing oxygen. In addition, ammonia or material which forms ammonia, is added to the sea water to increase its pH to near, but not significantly above 9.5. Preferably, a water-soluble nitrite salt, or material which forms such a salt, is added in a proportion which is effective for increasing the oil displacing capability of ammoniated seawater but is less than about 500 ppm. The resultant ammoniated and/or ammoniated and nitrited seawater is injected into the reservoir to displace oil toward a production location.

DESCRIPTION OF THE INVENTION

The present invention is, at least in part, premised on the following discoveries: Ammoniated seawater having a pH near, but less than about 9.5, is an effective floodwater for oil recovery. The addition of a relatively small proportion of water-soluble nitrite salt to ammoniated seawater increases the oil displacing capability of that seawater. Such a use of a nitrite salt in concentrations of less than about 500 ppm avoids a disadvantageous enhancing of the growth of sessile bacteria. In addition, the incorporation of relatively small proportions of surfactant in ammoniated and nitrited seawater provides a waterflood fluid capable of removing significant proportions of tertiary oil.

Experimental floods were conducted at 150° F. in $2'' \times 2'' \times 10''$ Berea sandstone cores of about 21% porosity and 600 md permeability to brine. First, the cores were saturated with synthetic "D" sand water, a high-salinity formation brine of about 120,000 ppm total dissolved salts and about 3000 ppm hardness. Next, the synthetic "D" sand water was displaced, by MC-194 field composite crude, to irreducible water saturation. Then the cores were waterflooded at a rate of one foot per day.

For purposes of comparison, laboratory waterfloods with Gulf of Mexico seawater and Gulf of Mexico seawater plus 100 ppm ammonia and 500 ppm sodium nitrite were conducted. A small additional amount of oil (45 vs. 48 percent of original oil in place) was recovered.

By analogy to caustic flood procedures, surfactants were added directly to such floodwaters. Two blends, an experimentally prepared internal olefin sulfonate ($C_{20-24}$ IOS) and Shell Chemical's NEODOL(TM) 25-3S alkoxyalcohol sulfate surfactant in 75/25 and 70/30 ratios, were judged most active by an emulsion screening test. Results of such water flooding with seawater alone and with ammoniated nitrited seawater plus 0.6% of the 75/25 blend were compared. (The surfactant concentration is reported on the basis of active ingredient.) Oil recovery increased from 45 percent using straight seawater to 68 percent using such ammoniated and highly nitrited seawater containing 0.6% of the 75/25 $C_{20-24}$IOS/NEODOL 25-3S blend. Tests were made at two different surfactant concentrations, namely 0.3 and 0.6% at a somewhat different ratio, namely 70/30 $C_{20-24}$ IOS/NEODOL 25-3S. After flooding, the amount of original oil in place recovered went from 45 percent with straight seawater to 57 percent with ammoniated and nitrited seawater containing 0.3% surfactant to 65 percent with ammoniated and nitrited seawater containing 0.6% surfactant. The 75/25 surfactant blend was slightly more effective than the 70/30 blend.

Three core floods were performed in accordance with the present invention in order to assess the contribution of nitrite in enhanced seawater recoveries. In conducting these experiments, the following changes from the previous test procedures were made:

MC-194 reservoir oil served as crude base, and co-produced "K" sand water served as source water.

Only 50 ppm ammonia and 50 ppm nitrite were added to the seawater. It was found that addition of 100 ppm nitrite, while being efficient in killing floating bacteria, actually causes sessile bacteria growth. But, the presently specified lower nitrite level avoids this possibly undesirable effect.

The flooding sequence chosen was a preferred procedure: Floodwater was injected into the formation first for pressure maintenance, before tertiary recovery methods were initiated.

The temperature was maintained at 125° F.

2"×2"×22" Berea sandstone columns were mounted vertically and subjected to upstream flow, to eliminate effects of viscosity ratios between the floodwater and the fluid in the columns.

Table 1 summarizes the results of three test runs, from which the following conclusions can be drawn:

stantial amount of additional oil was produced indicating that—at least in this tertiary operating mode—flow rates have an impact on ultimate oil recovery. Only in the last phase of run 3 was a surfactant breakthrough observed.

TABLE 1

COMPARISON OF AMMONIATED SEAWATER AND AMMONIATED-NITRITED SEAWATER AS TERTIARY FLOOD MEDIA

| | Percent of Original Oil in Place Recovered | | | | | |
|---|---|---|---|---|---|---|
| | Run #1 | Percent Recovery After Traditional Seawater Flood | Run #2 | Percent Recovery After Traditional Seawater Flood | Run #3 | Percent Recovery After Traditional Seawater Flood |
| Initial Oil Charge (at irreducible water saturation) | (47.5 | | 47.7 | | 56.7) | |
| ORIGINAL OIL IN PLACE RECOVERED: | | | | | | |
| After Seawater Flood (at irreducible oil saturation) | 43.6 | | 43.8 | | 46.2 | |
| After Flooding with Seawater + 50 ppm ammonia | ↓ | | 45.3 | 1.5 | ↓ | |
| After Flooding with Seawater + 50 ppm ammonia + 50 ppm sodium nitrite | 47.2 | 3.6 | ↓ | | ↓ | |
| After Flooding with Seawater + 50 ppm ammonia + 50 ppm sodium nitrite + 55 ppm ammonium bisulfite (nitrogen blanket) | ↓ | | ↓ | | 49.2 | 3.0 |
| After Flooding with Seawater + 50 ppm ammonia plus 0.3% Surfactant | ↓ | | 46.7 | 2.9 | ↓ | |
| After Flooding with Seawater + 50 ppm ammonia + 50 ppm sodium nitrite plus 0.3% Surfactant | 48.8 | 5.2 | | | ↓ | |
| After Flooding with Seawater + 50 ppm ammonia + 50 ppm sodium nitrite + 55 ppm ammonium bisulfite (nitrogen blanket) plus 0.3% Surfactant | | | | | 50.4 | 4.2 |
| After Flooding with Seawater + 50 ppm ammonia + 50 ppm sodium nitrite + 55 ppm ammonium bisulfite (nitrogen blanket) plus 0.3% Surfactant at increased flow rates | | | | | 60.8 | 14.6 |
| Percent of Post-Seawater Flood Oil in Place Recovered | 9.3 | | 5.2 | | 27.2 | |

Run 1: Tertiary flooding with ammoniated nitrited seawater.
Run 2: Tertiary flooding with ammoniated seawater.
Run 3: Tertiary flooding with ammoniated, nitrited, oxygen scavenged seawater at increasing flow rates.

(a) After oil production by seawater flooding is exhausted, additional oil is recovered by flooding with (1) seawater containing small amounts of ammonia and (2) seawater containing small amounts of both ammonia plus sodium nitrite. In a subsequent seawater flooding mode involving the above ingredients plus surfactants, another increment of oil is produced.

(b) Comparison of runs 1 and 2 demonstrates that both ammonia and sodium nitrite contribute to oil production by tertiary recovery methods.

(c) The addition of 0.3% of a 75/25 blend of $C_{20-24}$ Internal Olefin Sulfonate/NEODOL 25-3S is probably on the low side. Optimizing incremental oil recovery benefits versus surfactant cost may lead to a different surfactant level.

(d) Run 3 indicates that the addition of an oxygen scavenger (ammonium bisulfite) and inert gas blanketing does not substantially affect tertiary oil recovery.

(e) Each specified recovery mode involved flooding with an amount of seawater which was roughly equivalent to one pore volume of the sandstone formation. Pump rates were adjusted to two days per foot. However, due to poor pump performance, they often dropped to half the target rate.

At the end of run 3, the pump rate was increased dramatically due to a pump malfunctioning and a sub- Biocide testing (anaerobic cell suspension bottle test) with field cultures of SRB (Sulfate Reducing Bacteria) isolated from Michigan, Ventura and East Bay waterfloods has indicated that $NaNO_2$ (a common food preservative) could control bacterial growth at levels of 12.5-125 ppm; formaldehyde was active at 15-100 ppm.

However, results of comparative tests in a tubular device for measuring effectiveness of biocides on biofilm growth indicated a difference regarding $NaNO_2$. Adherent SRB and aerobe populations actually appeared to increase slightly with higher $NaNO_2$ levels. It is not known why bacterial numbers increased with $NaNO_2$ flooding but it is possible that the attached SRB are "protected" from high concentrations of $NaNO_2$ in the surface film. In this state they may be able to modulate the use of $NO_2^-$ as an alternative nitrogen source for growth. It appears that $NaNO_2$ is not an effective biocide at 20-200 ppm against biofilmed SRB compared to its inhibitory effect against these organisms in suspension ("floaters" or planktonic cells).

Compositions and Procedures Suitable for Use in the Present Invention

The present invention is applicable to recovering oil from substantially any subterranean reservoir in a location in which seawater is economically available. The invention is particularly suitable for a reservoir in which the oil exhibits a tendency toward increased emulsification when contacted with ammoniated and nitrited seawater, to an extent at least substantially equivalent to that exhibited by MC-194 reservoir oil.

The seawater utilized in the present invention can comprise substantially any which has been adequately treated for reduction of solids, bacteria and oxygen. In the present process, the combination of adding a biocide and an oxygen scavenger is preferably conducted so that at least significant proportion of chlorine is present in the seawater to which the oxygen scavenger is added and the oxygen scavenger is one which comprises, or forms bisulfite ions in the seawater. The oxygen content of the seawater is preferably lowered to less than about 50 ppb.

In a particularly preferred procedure for conducting the present process, seawater treated for reduction of bacteria, solids and oxygen is injected prior to the injection of such a seawater which has been ammoniated and nitrited. Fluid is preferably produced, with oil being recovered, during such a pretreatment. The extent of the pretreatment is preferably at least sufficient to establish a relatively stable and relatively rapid rate of flood water injection from injection to production locations. Such a pretreatment may be continued as long as the recovery of oil is economically attractive.

The seawater used in the present process can be ammoniated before, during or after none, some, or all of the treatments for reducing bacterial solids and oxygen. Substantially any form of ammonia or any composition capable of releasing ammonia in an aqueous solution can be added to effect the ammoniation. In general, amounts sufficient to raise the pH of the seawater to near, but not above, about 9.5, are preferred and amounts of about 10 to 100 ppm are particularly suitable.

The nitriting of the ammoniated seawater to be injected in the present process can be effected by adding substantially any compatible and water-soluble nitrite-containing, or releasing, material prior to, during or after the addition of ammonia, and/or optional treatments to reduce bacteria, solids, and/or oxygen. Substantially any compatible water-soluble nitrite-containing or releasing compound can be used. The amount added should be sufficient to increase the oil displacing capability of the ammoniated seawater while being less than enough to cause significant growth of sessile bacteria.

It is preferable to add surfactants for increasing the oil displacing capability of some or all of the ammoniated and nitrited sea water used in conducting the present invention. Such surfactants can be substantially any which are compatible with aqueous solutions containing ammonium and nitrite ions and are capable of increasing the oil displacing ability of aqueous liquids. Particularly where the reservoir oil to be recovered is significantly acidic, the added surfactant should be one capable of acting as a cosurfactant in a surfactant system containing soaps of the petroleum acids in the reservoir oil. Particularly suitable surfactants for such a use comprise those described in U.S. Pat. No. 4,502,541 by J. B. Lawson and D. R. Thigpen. The disclosures of that patent are incorporated herein by reference.

What is claimed is:

1. A waterflood process for recovering oil from a subterranean reservoir in a location in which seawater is economically available, comprising:

incorporating within the seawater, at least prior to its injection into the reservoir, about 10 to 100 ppm ammonia or ammonia-yielding material to raise the pH to near, but less than, about 9.5, plus enough nitrite ion-containing or ion-yielding material to increase the oil displacing capability of the ammoniated seawater without causing an undesirable increase of the rate of growth of sessile bacteria; and injecting the ammoniated and nitrited seawater into the reservoir to displace the reservoir fluid at substantially the natural reservoir temperature toward a production location from which oil is recovered.

2. The process of claim 1 in which the seawater is treated to the extent required for removing bacteria, solids and oxygen prior to its injection into the reservoir.

3. The process of claim 2 in which chlorine or chlorine-releasing material is added to the seawater being treated and a bisulfite ion-containing or ion-releasing material is added to that seawater.

4. The process of claim 1 in which a portion of seawater substantially free of bacteria, solids and oxygen, is injected prior to the injection of the ammoniated and nitrited seawater.

5. The process of claim 4 in which a surfactant effective for increasing oil displacing capability is incorporated within the ammoniated and nitrited seawater.

6. The process of claim 1 in which a surfactant capable of increasing oil displacing capability is incorporated within the ammoniated and nitrited seawater.

* * * * *